United States Patent [19]

Gast et al.

[11] 3,815,018

[45] June 4, 1974

[54] MAGNETIC GAS ANALYZER USING A GAS CHAMBER FOR IMPROVED GAS FLOW WITH MAGNETS EXTERNAL TO SAID CHAMBER

[75] Inventors: Theodor Gast; Lorenz Twisselmann, both of Berlin; Wolf-Rudiger Marx, Bergen-Enkheim, all of Germany

[73] Assignee: Hartmann & Braun Aktiengesellschaft, Frankfurt am Main, Germany

[22] Filed: Nov. 20, 1972

[21] Appl. No.: 308,185

[30] Foreign Application Priority Data
Nov. 26, 1971 Germany.......................... 2158715

[52] U.S. Cl.................................. 324/36, 73/27 A
[51] Int. Cl............................................. G01r 33/12
[58] Field of Search ................. 324/36; 73/23, 27 A

[56] References Cited
UNITED STATES PATENTS
2,666,893  1/1954  Munday.............................. 324/36
2,744,234  5/1956  Munday et al....................... 324/36
3,648,162  3/1972  Cederstrand et al. ................ 324/36
3,714,557  1/1973  Gast..................................... 324/36

FOREIGN PATENTS OR APPLICATIONS
191,888  1/1967  U.S.S.R................................ 324/36

Primary Examiner—Robert J. Corcoran
Attorney, Agent, or Firm—Ralf H. Siegemund

[57] ABSTRACT

A test body is suspended in an inhomogeneous magnetic field in a chamber and exposed to a gas to be tested. The test piece comprises a pair of axially opposite arms movable about an axis of rotation, each arm including a non-magnetic, flat, disk-shaped member and a continuous double loop of wire supporting the members at opposite ends of the axis in a plane substantially at right angles to the lines of force in the nonuniform magnetic field. The test body varies its position in the magnetic field in accordance with variations in the composition of the gas, the latter being conducted past the disk-shaped members, to flow symmetrically to the rotation axis.

9 Claims, 3 Drawing Figures

PATENTED JUN 4 1974　　3,815,018
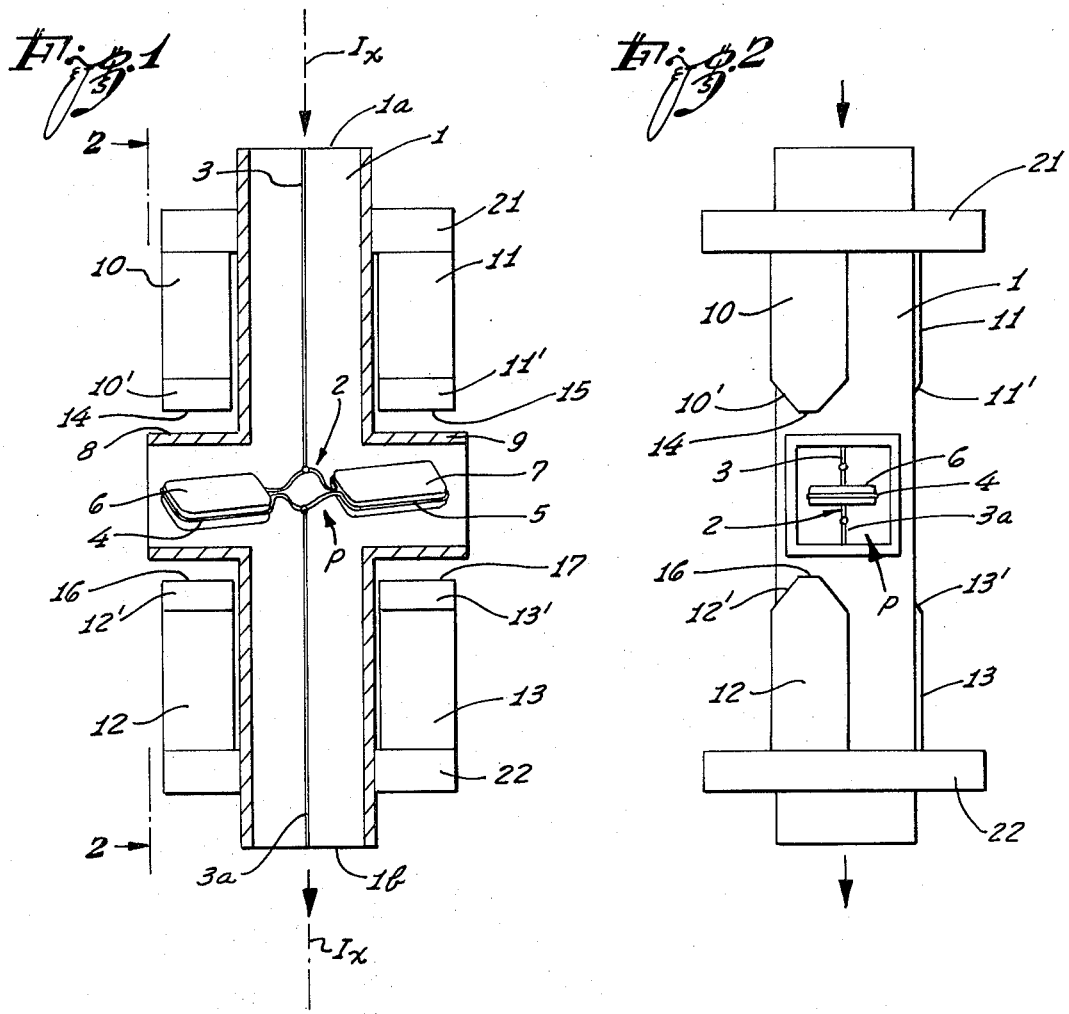
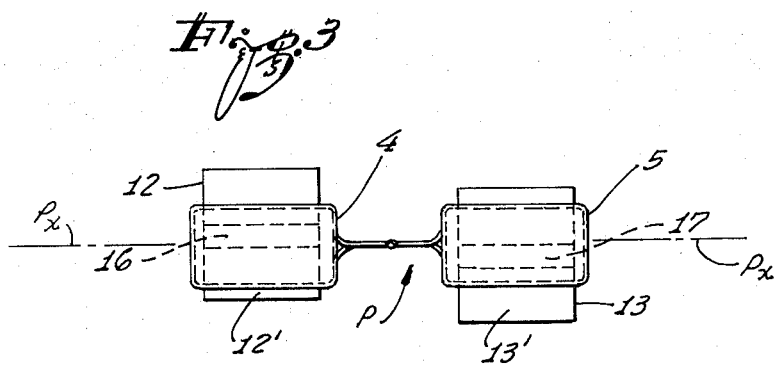

MAGNETIC GAS ANALYZER USING A GAS CHAMBER FOR IMPROVED GAS FLOW WITH MAGNETS EXTERNAL TO SAID CHAMBER

BACKGROUND OF THE INVENTION

The present invention relates to apparatus for magnetic gas analysis, and more particularly, to apparatus for determining the oxygen content in a gas.

Apparatus of this type comprises an elongated test body in the form of a dumbbell, suspended at its center of inertia and on an axis in relation to which the body has maximum moment of inertia. The body may turn on the axis but against action of a return force. The dumbbell is particularly suspended inside of a chamber filled with the gas to be tested.

The chamber is made of a nonmagnetic material, and situated between facing poles of magnets arranged to produce a nonuniform magnetic field in the chamber. The known test bodies comprise elongated bars and outer spheres integral with the respective bar, at opposite ends thereof. A rigid frame comprising a length of wire encircles each sphere of such a test body and forms a loop around each sphere. The two loops have equal dimension and lie in the same plane which is a central plane through the test body and which extends at right angles to the lines of force in the nonuniform magnetic field. The inner ends of the wire are conductively connected to electrically conductive suspension strips suspending the test body substantially at its center of gravity and between the pole pieces of the magnets. Simultaneously, the suspension strips enable passing of an electric current through the wire of the test body and are rigidly supported at both ends in the chamber.

The apparatus is arranged such that variation in the composition of the test gas in the chamber may change the magnetic susceptibility of the gas as surrounding the test body and that change, in turn, causes a variation of position or deflection of the test body in the magnetic field. The movement or displacement of the test body is used, when suitably calibrated, to determine the chemical components, such as oxygen or other paramagnetic gaseous components in a test gas.

Since the force reactions causing and resulting from the displacement of the test body are rather small, the test body, of necessity, has to be of light construction. In spite of that, the deflections of the test body are still minute and high precision is in order.

Angular deflection of the test body in accordance with the magnetic susceptibility of the gas surrounding it, may be measured optically as, for example, described in German Patent No. 947,932 or U.S. Letters Patent No. 2,416,344. Alternatively, the angular deflection of the test piece may be measured electrically by measuring the amount of current needed to exactly opposite the magnetic moment tending to cause deflection of the test body. More particularly, the current is supplied to the wire frames via the suspension strips and may be adjusted either manually or automatically to induce a moment equal and opposite to the magnetic moment acting on the test body, whereby to return the test body to its balance position or tending to maintain it in a fixed position. This current, when suitably calibrated, indicates the extent of the magnetic moment acting on the test body, and thus of the composition of the gas surrounding it. A system of this type is, for example, described in German Publication No. 1,951,532 or U.S. Letters Patent No. 2,744,234.

Apparatus of the type described are not satisfactory because based on their rather complicated structure and the small measurable force effects involved, the test body of the apparatus is extremely sensitive to exterior influences such as, for example, vibrations or flow irregularities of the gases to be tested. This, as a result, negatively influences the measuring precision of the apparatus.

SUMMARY OF THE INVENTION

It is the object of the invention to provide a device for magnetic gas analysis to determine the chemical components of a gas, and which device is less sensitive to exterior influences and, moreover, offers a simplified construction. In accordance with the principle aspect of the invention, it is suggested to provide the test body in dumbbell configuration but using flat disks rather than spheres, wherein the disks have their flat configuration in the plane of rotation in which also extend strong magnetic field gradients due to magnetic field inhomogeneities. It is further suggested to cause the test gas to flow along the disks, above and below, and in a symmetric flow configuration in relation to the axis of rotation of the test body.

Such a device according to the invention is preferably constructed to include a vertical chamber having upper and lower open ends, and a pair of axially opposite branch portions extending outwardly, in a plane perpendicular relative to the longitudinal axis of the chamber and intermediate the upper and lower ends thereof. Each of the branch portions is positioned between the facing poles of a pair of magnets provided to produce an inhomogeneous magnetic field in the branches. An elongated test body is suspended in the chamber at its center of inertia and comprises a pair of axially opposite, generally flat-shaped disks, each of the disks being positioned in one of the branches of the chamber and in the respective nonuniform magnetic field produced therein.

A rigid wire frame comprising a continuous double loop of wire is arranged such that each loop encircles and supports one of the disks separately, one of the loops being mounted on one side of the axis of rotation of the test body and the other of the loops being mounted on the opposite side of the axis, and both loops lying in a plane which intersects the axis at a right angle. The inner ends of the wire are conductively interconnected and coupled to electrically conductive suspension strips at the point of intersection of the longtudinal axes of the chamber and of the branch portions thereof to maintain the test body completely balanced.

A gas sample or a gas to be tested is introduced into the chamber and is conducted from the top to the bottom thereof (or vice versa). A portion of this gas is directed laterally outwardly through the branch portions of the chamber and flows past the disks, symmetrically to the rotation axis of the test piece. As a result, a flow relationship results which provides a positive stabilizing effect on the test body.

Furthermore, this arrangement enables a relatively high rate of gas flow (flow speed) which, as a result of changes or variations in the composition of the gas under test, increases the response of the system to changes of the magnetic susceptibility of the gas and thereby the deflections of the test body.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a vertical cross-sectional view of the apparatus according to the preferred embodiment of the invention, showing the interior of the test chamber and showing further the test body therein but in a somewhat perspective view with a downward tilt for illustrative purposes; in reality the test body would be seen in edge view analogous to FIG. 2;

FIG. 2 is a perspective side view of the apparatus of FIG. 1, illustrating the structure and relative positioning of the magnets with respect to the chamber and test piece; and FIG. 3 is a top view of the test body, supporting loops and lower magnet poles of FIGS. 1 and 2.

Referring now to the drawings in which like reference numerals index like parts, FIGS. 1 and 2 show an elongated, vertically extending tubular chamber 1 having axially oppposite open ends, 1a and 1b, and a longitudinal axis 1x. Intermediate the upper and lower ends, 1a and 1b, the chamber 1 is provided with axially opposite, laterally outwardly extending branches, 8 and 9, having a common axis which extends transversely to the longitudinal axis 1x of the chamber.

A test body or test piece, generally indicated at P, is suspended at its center of inertia in the chamber by means of electrically conductive suspension strips 3, 3a, which are rigidly supported at both ends of the chamber by means which are not shown, but are conventional for this purpose. The strips 3 and 3a extend longitudinally in and along the axis of chamber 1. The test piece comprises a pair of elongated, axially opposite and generally flat-shaped disks, 6 and 7, of a nonmagnetic material. Within the content of this invention, nonmagnetic is to mean a material which has a magnetic susceptibility that is negligibly small in relation to the magnetic susceptibility of the gas component to be detected.

Each of the disks is positioned in one of branches 8 and 9 of the chamber 1, for free movement therein as far as the branches 8 and 9 are concerned. An electrically conductive, rigid wire frame 2, comprising a continuous double loop of wire is arranged such that its loops 4 and 5 encircle and support respectively the disks 6 and 7 and separately in branches 8 and 9. Accordingly, one of the loops is mounted on one side of the axis 1x of rotation of the test body or piece P, and the other of the loops is mounted on the opposite side of axis 1x. The magnet axes of both loops 4, 5, extend parallel to the axis of the rotation axis 1x of test piece P. However, the configuration 4, 6 and 5, 7 defines a common axis Px which intersects axis 1x of rotation at a right angle. The two axes 1x and Px respectively define the axes for maximum and minimum moments of inertia of the dumbbell-like structure. The test body may be suspended so that its axis Px coincides with the axis of tubular portions 8 and 9 when the test body is in equilibrium position.

The inner ends of the wire are conductively interconnected and coupled to the suspension strips 3 and 3a, respectively above and below the point of intersection of the longitudinal axis 1x of chamber 1, and of the colinear axes of branches 8 and 9 so as to maintain the test piece P in a completely balanced position. As shown, disks 6 and 7, as well as the respective wire loops 4 and 5 supporting them, extend radially outwardly from this intersection point and into the branches 8, 9. Disks 6 and 7 are preferably hollow and have been made by bonding such as soldering or cementing half shells together. The disks may be filled with a gas which does not contain the component to be detected, preferably having no noticeable magnetic susceptibility. The edge surfaces of disks 6 and 7 are suitably provided with peripheral grooves in which the wire loops 4 and 5 are firmly positioned.

Two sets of permanent magnets, 10, 11 and 12, 13 are mounted to the outer surfaces of the chamber 1 by means of plate-shaped yokes, 21 and 22, which enclose the chamber at the upper and lower end thereof. The magnets, 10', 11' and 12', 13' face the branches 8, 9, and produce an inhomogeneous magnetic field in each of these branches, but from the outside thereof.

As shown in FIGS. 2 and 3, the pole pieces 10', 11' and 12', 13' define tapered shoes, terminating in generally rectangular end faces, 14, 15, and 16, 17, which, in the illustrations shown, extend in a plane parallel to the generally planar surfaces of disks 6 and 7. The pairs of end faces 14 and 15, and 16 and 17, are respectively offset with respect to the rotation axis 1x of test body 1. As clearly shown in FIG. 3, end faces 14 and 16 have position offset to the axis Px, to one side thereof, while end faces 15 and 17 have correspondingly offset position but to the other side of axis Px.

By this arrangement, the disks 6 and 7 are exposed to maximum force as resulting from inhomogenic magnetic fields, provided, of course, there is a difference in magnetic susceptibility as between disks 6 and 7 on the one hand and the immediate environment thereof on the other hand. The arrangement as such is constructed to obtain a high degree of deflection of the test body, and which deflection considerably contributes to the stability of the test piece. In order to obtain maximum intensity of deflective forces and a high degree of deflection, the wire loops 4 and 5 lie in a plane which is substantially at right angles to the lines of force in the nonuniform magnetic field.

As can be seen further, the disks are of elongated construction, wherein the direction of elongation is radial with respect to axis 1x. The pole shoe faces 14 to 17 are likewise elongated, the direction of elongation being parallel to the direction of extension of the disks, but due to the offset position of the poles, that direction of extension of the pole shoe faces is somewhat offset from a line intersecting axis 1x.

A gas which is to be measured to determine its chemical content is introduced into chamber 1 and follows a flow-path as indicated by the arrows in FIGS. 1 and 2. The flow-path runs, for example, from top 1a of chamber 1 to the lower or discharge end 1b thereof. However, the direction of gas flow could be in the reverse. Nevertheless, in either case, a portion of the gas is thereby directed laterally outwardly into and through the branches, 8, 9, and flows past the disks 6 and 7, symmetrically to the rotation axis 1x of test body P. Variation in the composition of the gas, creating a variation in the magnetic susceptibility of the gas, will cause deflection of the test body in the magnetic field and this deflection is employed when suitably calibrated to determine the exact contents of the gas.

As a result of directing the gas outwardly as described, an extremely stable operation of the test body is obtained. Since the magnetic poles are outside of the gas system, the flow-path is significantly constricted while the magnetic poles do not influence the flow pattern.

The best position for the test body for obtaining maximum deflective force on the disks 6 and 7 (i.e. a maximum of the local magnetic field multiplied by the gradient of the magnetic field in a direction in a plane transverse to axis 1x), will be established by means of a calibrating or position offset current fed to the wire loops for deflecting the body P into the best position for the measuring purpose. The electric current branches into the two loops 4 and 5 and their lengths (resistances) are adjusted to obtain equal currents therein. The adjustment as to this position is, of course, carried out without any gas in the chamber, or by driving a gas through chamber 1 with negligible magnetic susceptibility.

Upon driving a measuring gas into tube 1, test body P is deflected and the deflection may be measured optically as is known per se. Alternatively, the angular deflection of the test piece may be measured indirectly by driving an electric current into the wire loop and by measuring the amount of current needed to exactly offset the magnetic moment acting on body P and tending to cause deflection. The measured current then indicates the extent of the magnetic moment acting on the test piece or body, and thus of the composition of the gas surrounding the test piece.

Any electric current is supplied to the wire frame of the test body by way of the electrically conductive suspension strips 3 and 3a and may be controlled manually or automatically.

The invention is not limited to the embodiments described above but all changes and modifications thereof not constituting departures from the spirit and scope of the invention are intended to be included.

We claim:

1. In an apparatus for measuring the magnetic susceptibility of gases having means defining a chamber into which a gas to be tested is introduced; further having magnetic means producing two separated inhomogeneous magnetic fields in said chamber; further having elongated test body means movably suspended at its center of inertia in said chamber for rotation on an axis, the improvement comprising:

the body means being a pair of generally flat, disk-shaped members spaced apart and respectively positioned in said magnetic fields so that their flat configuration is in the plane of rotation on said axis, and extends in directions of inhomogeneities of the magnetic fields;

the chamber being defined by a first duct extending along and containing the means for suspending said body, the chamber having a pair of branch ducts communicating with the first duct and extending radially opposite therefrom and in relation to said axis, said magnetic means including two pairs of opposed pole shoes with each of said pairs facing one of said branch ducts but outside thereof to produce inhomogeneous magnetic fields therein, said pair of disk-shaped members being respectively positioned in said branch ducts and being exposed to said magnetic fields, the gas as introduced into the first duct flowing into the branch ducts along said disk-shaped members and in opposite radial directions past said disk-shaped members, and providing for a flow-path symmetrically to said axis, whereby to adjust the relative position of said test body in said chamber on said axis in accordance with the magnetic susceptibility of said gas.

2. An apparatus as defined in claim 1, wherein said chamber extends vertically and has an upper inlet end or outlet, and a lower outlet or inlet end, said branch portions being positioned intermediate said inlet and outlet ends, said magnetic means including a pair of magnets positioned alongside the outer periphery of said chamber and being connected thereto by yoke means for enclosing the upper and lower ends of said chamber.

3. An apparatus as defined in claim 1, said magnetic means including two pairs of opposed, tapered pole pieces and terminating in planar end surfaces facing said disk-shaped members.

4. An apparatus as defined in claim 3, wherein the planar end surfaces of each pair of opposed pole pieces extend parallel to each other.

5. An apparatus as defined in claim 4, said planar end surfaces of each pair of opposed pole pieces and said disk-shaped members being elongated in said plane and extending parallel to each other in direction of their elongation; the disk-shaped members extending towards said axis, the direction of extension of said end surfaces being somewhat off a radial direction towards the axis.

6. An apparatus as defined in claim 1, said test body being suspended by means of electrically conductive suspension strips extending longitudinally within said first duct and being rigidly supported therein, said test body being movably coupled to said strips by way of a conductive wire frame, the wire frame having loops holding the disk members respectively along the periphery thereof.

7. An apparatus as defined in claim 1, each of said disk-shaped member being peripherally provided with a groove, said loops being positioned in said grooves.

8. An apparatus as defined in claim 1, said disk-shaped members being made of a nonmagnetic material.

9. An apparatus as defined in claim 1, each of said disk-shaped members being constituted by a pair of thin-walled sections cemented or soldered together to form one member.

* * * * *